United States Patent
Seidel et al.

(10) Patent No.: US 11,422,442 B2
(45) Date of Patent: Aug. 23, 2022

(54) SYSTEM FOR INTERACTIVELY PROJECTING GEOMETRICALLY ACCURATE LIGHT IMAGES INTO A PROJECTION ENVIRONMENT OR ZONE OF COMPLEX THREE-DIMENSIONAL TOPOGRAPHY

(71) Applicant: Ideal Perceptions LLC, Columbia, MO (US)

(72) Inventors: Daniel Seidel, Columbia, MO (US); Andrew Todd, Columbia, MO (US)

(73) Assignee: IDEAL PERCEPTIONS LLC, Columbia, MO (US)

( * ) Notice: Subject to any disclaimer, the term of this patent is extended or adjusted under 35 U.S.C. 154(b) by 0 days.

(21) Appl. No.: 16/318,288

(22) PCT Filed: Jul. 17, 2017

(86) PCT No.: PCT/US2017/042432
§ 371 (c)(1),
(2) Date: Jan. 16, 2019

(87) PCT Pub. No.: WO2018/017492
PCT Pub. Date: Jan. 25, 2018

(65) Prior Publication Data
US 2019/0236989 A1    Aug. 1, 2019

Related U.S. Application Data

(60) Provisional application No. 62/493,783, filed on Jul. 16, 2016.

(51) Int. Cl.
*G03B 21/14*    (2006.01)
*G09F 19/18*    (2006.01)
(Continued)

(52) U.S. Cl.
CPC ............. *G03B 21/142* (2013.01); *G03H 1/00* (2013.01); *G09F 19/12* (2013.01); *G09F 19/18* (2013.01);
(Continued)

(58) Field of Classification Search
CPC ....... G09F 19/18; G09F 19/12; G03B 21/142; G03B 21/14; G03B 17/54; G09G 3/001;
(Continued)

(56) References Cited

U.S. PATENT DOCUMENTS 6,050,690 A    4/2000    Shaffer et al.
6,184,296 B1   2/2001    Khosravi et al.
(Continued)

FOREIGN PATENT DOCUMENTS

JP    H01250707 A   *  10/1989   ............. G01B 11/24

OTHER PUBLICATIONS

International Search Report and Written Opinion received for PCT/US2017/042432, dated Sep. 29, 2017.
(Continued)

*Primary Examiner* — Magda Cruz
(74) *Attorney, Agent, or Firm* — Greer, Burns & Crain, Ltd (57) ABSTRACT

Embodiments of the invention provide apparatuses, methods, and systems for projecting images into a projection zone, while having the capability to detect the presence and movement of objects in the projection zone and to interact with those objects, according to programmed interactions. One of the programmed interactions may be to detect objects in the projection zone and avoid projecting light onto them. The capability to detect and avoid objects in the projection zone may allow for the use of high intensity light images including laser light images around people and animals without the risk of eye injury. Another programmed inter-
(Continued)

action may be to project an illuminated image around people and objects in the projection zone to emphasize their presence and movement.

8 Claims, 9 Drawing Sheets

(51) Int. Cl.
*G09G 3/00* (2006.01)
*G03H 1/00* (2006.01)
*G09F 19/12* (2006.01)
*G09G 5/00* (2006.01)

(52) U.S. Cl.
CPC ............ *G09G 3/001* (2013.01); *G09G 3/003* (2013.01); *G09G 5/00* (2013.01); *G09G 2340/14* (2013.01)

(58) Field of Classification Search
CPC ...... G09G 3/003; G09G 5/00; G09G 2340/14; G02B 26/08; G02B 27/22; G06F 3/0425
See application file for complete search history.

(56) References Cited

U.S. PATENT DOCUMENTS

| | | | |
|---|---|---|---|
| 6,382,798 B1* | 5/2002 | Habraken | G02B 5/203 348/40 |
| 8,290,208 B2 | 10/2012 | Kurtz et al. | |
| 9,268,520 B1* | 2/2016 | Cederlof | H04N 9/3179 |
| 2005/0017967 A1* | 1/2005 | Ratti | G06F 3/0425 345/418 |
| 2005/0117132 A1* | 6/2005 | Agostinelli | H04N 5/7416 353/122 |
| 2007/0070207 A1* | 3/2007 | Sakurai | H04N 5/23293 348/207.99 |
| 2008/0062164 A1 | 3/2008 | Bassi et al. | |
| 2009/0091710 A1* | 4/2009 | Huebner | G03B 21/14 353/28 |
| 2011/0181553 A1* | 7/2011 | Brown | G06F 3/0425 345/175 |
| 2011/0181704 A1* | 7/2011 | Gordon | G01B 11/002 348/49 |
| 2014/0036235 A1 | 2/2014 | Chang et al. | |
| 2015/0300816 A1* | 10/2015 | Yang | G01N 21/4738 600/424 |
| 2018/0136331 A1* | 5/2018 | Rosenzweig | G01S 7/4868 |
| 2018/0373329 A1* | 12/2018 | Fisunenko | G06F 3/013 |
| 2019/0135450 A1* | 5/2019 | Zhou | G05D 1/12 |

OTHER PUBLICATIONS

International Preliminary Report on Patentability received for PCT/US2017/042432, dated Jul. 22, 2018.

* cited by examiner

SYSTEM FOR INTERACTIVELY PROJECTING GEOMETRICALLY ACCURATE LIGHT IMAGES INTO A PROJECTION ENVIRONMENT OR ZONE OF COMPLEX THREE-DIMENSIONAL TOPOGRAPHY

CROSS-REFERENCE TO RELATED APPLICATION

This application claims the benefit of U.S. Provisional Application 62/493,783, filed Jul. 16, 2016.

TECHNICAL FIELD

The present disclosure relates generally to one or more methods, systems, and/or apparatuses for interactively projecting one or more images on a surface, and further includes eye safety features and other interactive capabilities.

BACKGROUND ART

Presently, there are many types of optical projectors including high intensity laser projectors. High intensity projectors, must be operated with precautions to avoid eye damage. Coherent laser light can be especially damaging to eyes. The potential for eye damage has limited the use of high intensity optical projectors.

Presently, there are a few types of projectors that can alter the projected images to react to motions and gestures of the users. For example, U.S. Pat. No. 8,290,208 describes a system for "enhanced safety during laser projection" by attempting to detect an individual's head, define a "head blanking region", and then track the "head blanking region" to avoid projecting laser light at the individual's head. Most of these projectors are used for entertainment, presentation, and visual aesthetics.

Reactive projectors are not commonly employed in industrial applications. Opportunity exists for a high intensity interactive projector with safety features that allow safe operation around people without risk of eye damage.

SUMMARY DISCLOSURE OF INVENTION

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

Aspects of the present invention relate to optical projectors including laser projectors and projectors having eye safety features and interactive capabilities.

An Interactive Projection System ("IPS") is capable of projecting light images into a projection zone. The IPS is also capable of sensing and reacting to the presence and movement of objects within the projection zone according to programmed interactions. One programmed interaction may be to avoid projecting light onto protected objects in the projection zone. Such an ability to sense and avoid protected objects would allow the use of high intensity light such as laser light without the risk of eye damage or discomfort to people within the projection zone.

Aspects of the present invention may include a computerized system for interactively projecting images into a projection zone. An exemplary system may include, but is not limited to, at least one light projecting device, at least one computing device, where the computing device is in operative communication with the at least one light projecting device for transmitting controls signals to the at least one light projecting device. The computing device may include, among other things, one or more computer processors. The exemplary system may further include one or more computer-readable storage media having stored thereon computer-processor executable instructions, with the instructions including instructions for controlling the at least one light projecting device to project one or more pre-determined images into the projection zone.

BRIEF DESCRIPTION OF THE DRAWINGS

For a better understanding of the disclosure, and to show by way of example how the same may be carried into effect, reference is now made to the detailed description along with the accompanying figures in which corresponding numerals in the different figures refer to corresponding parts and in which the drawings show several exemplary embodiments.

DETAILED DESCRIPTION OF THE INVENTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

As noted above, there are presently many types of optical projectors including high intensity laser projectors. High intensity projectors, must be operated with precautions to avoid eye damage. Coherent laser light can be especially damaging to eyes. The potential for eye damage has limited the use of high intensity optical projectors. Presently, there are a few types of projectors that can alter the projected images to react to motions and gestures of the users. Most of these projectors are used for entertainment, presentation, and visual aesthetics. Reactive projectors are not commonly employed in industrial applications.

Aspects of an exemplary IPS generally contemplate an optical projection system having the capability to detect the presence and movement of objects in the projection zone and to interact with those objects, according to programmed interactions. One of the programmed interactions may be to detect objects in the projection zone and avoid projecting light onto them. The capability to detect and avoid objects in the projection zone may allow for the use of high intensity light images including laser light images around people and animals without the risk of eye injury. Another programmed interaction may be to project an illuminated image around people and objects in the projection zone to emphasize their presence and movement.

Figure 1:
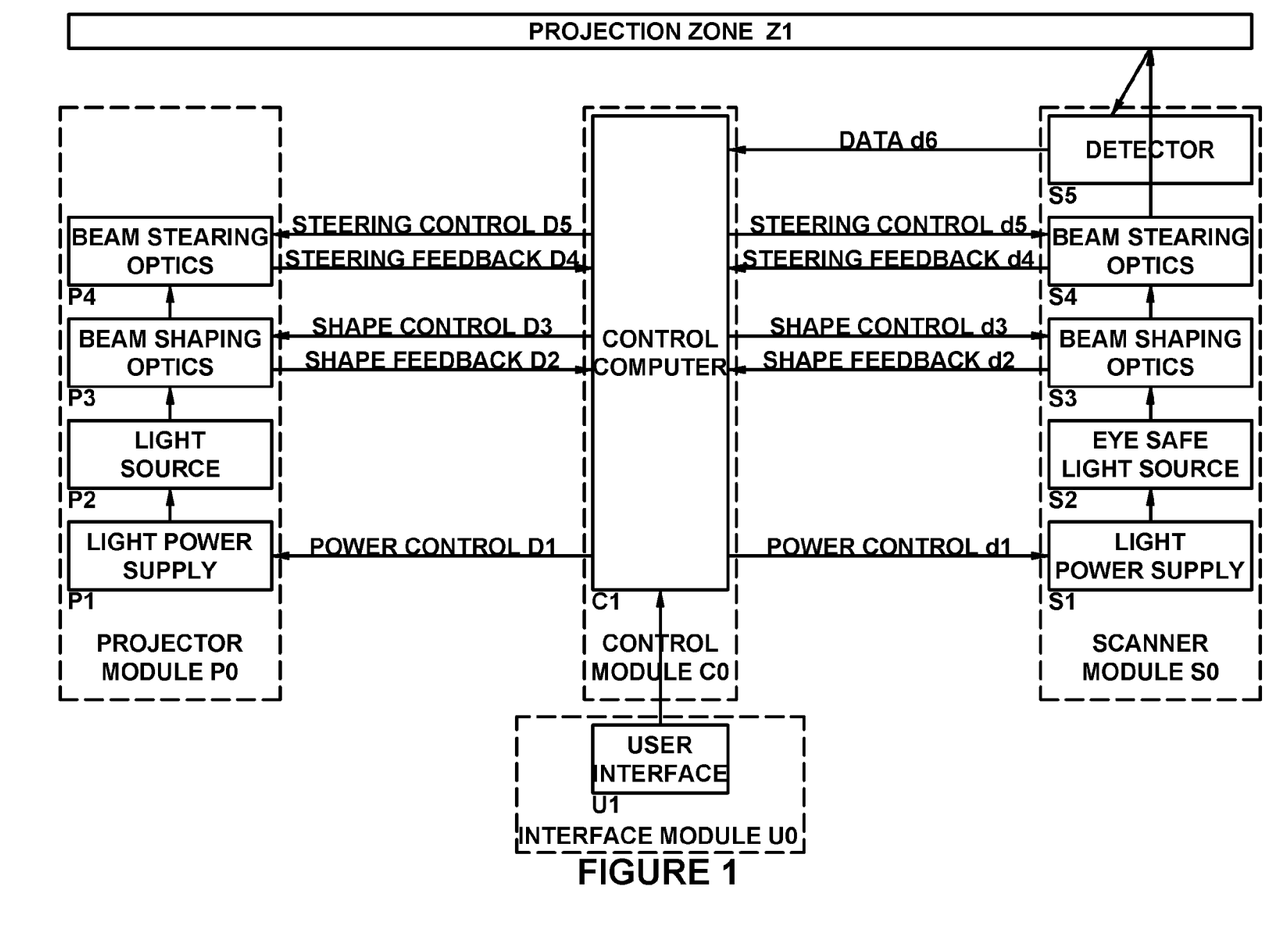
FIG. 1 illustrates an exemplary process flow diagram for an IPS, according to various aspects described herein.

FIG. 1 illustrates an exemplary process flow diagram for an interactive projection system. The example shown in FIG. 1 depicts a projector module P0, a scanner module S0, a control module C0 and an interface module U0 and the various elements within each module. There may be one or more of any element in the modules. There may be multiple of any module in an IPS system. The modules may be located together in a single unit or remotely located. The signal interactions between modules may be via wire transmission or, wireless transmission. The scanner S0 and projector P0 modules may have one or more processors or controllers that interact with the various elements of the respective modules and communicate with the control computer C1, or the various elements of the respective modules may interact with the control computer C1 directly.

Various projector modules may be configured featuring one or more light sources. By way of demonstration and not limitation, the one or more light sources may include single source, multi-source, incoherent, coherent, laser, visible, invisible, multi-milliwatt, multi-watt, multi kilowatt, or some combination thereof. The beam steering optics may be configured for the desired projection angles including 360-degree projection and global projection. Referring to FIG. 1 and the projector module P0, a light power supply P1 provides electrical power to light source P2. Light source P2 generates a beam of light that is propagated or otherwise directed to the beam shaping optics P3. The beam shaping optics P3 may be actuated via control D3 signals from the control computer C1 to modulate the beam geometry and focus. The shaped beam then propagates to the beam steering optics P4. The beam steering optics P4 may be actuated in relation to control D5 signals from the control computer C1 to direct the light beam to the desired points within the projection zone Z1.

Various scanner modules may be configured to include one or more appropriate scanners, such as but not limited to, passive scanners, active scanners, laser scanners, Light Detection and Ranging ("LIDAR") scanners, acoustic scanners, photosensitive scanners, photographic scanners, videographic scanners, or some combination thereof. The computer module C1 may be programmed or otherwise configured to analyze data received from the one or more scanners to perform object detection and/or recognition algorithms, e.g., computer vision. Referring to FIG. 1 and the scanner module S0, the scanner module S0 operates similarly to the projector module P0 but with the addition of a detector S5 to sense light reflected from the projection surface. The light source S2 of the scanner module may include visible light, invisible light, or some combination thereof. The light source S2 may be of a magnitude and focus sufficient to cause detectable reflections from the projection zone Z1 at the designed operating distance, but not sufficient to cause eye damage.

The control computer C1 may signal the scanner power supply S1 to produce a pulse of light. The light pulse is modulated through the beam shaping optics S3 directed by the beam steering optics S4 to a point in the projection zone Z1. The pulse may be reflected and/or scattered by a surface in the projection zone Z1. A portion of the pulse may return to the scanner module S0 and be sensed by the detector S5. The control computer C1 may monitor the control and feedback signal d1-d6 data associated with each pulse including a time at which the pulse was generated, one or more modulation settings of the beam shaping optics d2, the position of the beam steering optics d4, a time at which the reflected pulse was detected, other appropriate signals, or some combination thereof. With these values known, the control computer C1 may compute an azimuth and distance to the reflection point and determine the reflective properties of the surface. This process may be performed repeatedly as the pulses are steered to different points in the projection zone. The azimuth, distance, and reflective properties associated with each point may be stored by the control computer C1. In this manner, the projection zone may be scanned and the data stored as one or more three-dimensional topographical models of the projection zone Z1.

It should be clear to one of skill in the pertinent arts that various user interface modules U0 may be configured, either computerized or non-computerized, without departing from the scope of the present invention. Furthermore, the IPS may be configured to operate with or without the user interface module U0, without departing from the scope of invention.

Referring again to FIG. 1, the control computer C1 coordinates the power, shape, and direction of the beams propagating from the projector and scanner modules via one or more control and/or feedback signals D1-D5, d1-d6. The control, feedback and/or detector data signals d1-d6 from the scanner module S0 may be computationally analyzed by the control computer C1 to yield topographical data of the projection surface Z1.

Referring further to FIG. 1, operation of an exemplary IPS may generally proceed as follows: The user initiates an IPS setup mode via the user interface U1. The user interface U1 prompts the user to ensure that the projection zone Z1 is void of people or other light sensitive objects. When the user confirms that the projection zone Z1 is clear, the control module C0 and scanner module S0 perform a scan of the projection zone Z1. The scan is stored in the control computer S1 memory as the baseline scan for the projection zone Z1. The control computer C1 presents the baseline image to the user via the user interface U1. The user adds any combination of text, symbols, images, or animations to the baseline image via the user interface U1. When the user initiates projection mode, the control module C0 controls the projector module P0 to trace the graphic images defined by the user onto the projection surface.

The IPS may be programmed with many interactive behaviors. The user may initiate pre-programed interactive behaviors via the user interface U1. The user may also program new interactive behaviors via the user interface U1. These interactive behaviors generally cause at least one associated correction factor to be applied to the image or cause the projector to project the image in an otherwise altered form. These "correction factors" are described herein. One programmed behavior may be to detect objects in the projection zone Z1 and avoid projecting light onto them. Such a "detect and avoid" feature may be accomplished as follows: The scanner module S0 repeatedly scans the projection zone Z1 and the control module C0 compares the current scan with the baseline scan. If any regions of the current scan are different than the baseline scan, the control computer C1 defines that those regions as occupied by a protected object 5 and defines a protection zone 7 with respect to those protected objects. For example, the IPS may find and exclude objects that were not present in the baseline image and/or may utilize more advanced algorithm to identity what the objects are and apply correction factors based on the identity of the objects. These protection zones 7 are hereinafter referred to as protected object zones 7. In some instances, the protected object zone 7 may be larger than an associated protected object 5 by a pre-defined margin of safety. The control computer C1 may monitor the beam steering control or feedback signals D4,D5 from the projector module P0. If a beam from the projector module is preparing to steer into a protected object zone 7, the control computer C1 may apply a "correction factor" to interrupt the power to the light source P2 in the projection module P0 until the beam is steered outside of the protected object zone 7. In this manner, the control computer C1 may disallow projection into any protected object zone 7 on a "real-time" or near "real-time" basis. The resulting effect is that people, animals, or other objects may be present or move into in the projection zone and the IPS will interactively avoid (or attempt to avoid) projecting light onto them.

Another programmed behavior may be to project an illuminated graphic around protected objects 7 to emphasize their presence and movement. Another programmed feature may be geometric correction of projection images. Without adjustment, a projected image will be distorted if the projection surface is not perpendicular to the projection beam, or if the projection surface is not flat. The IPS control module C0 may use topographical data from the scanner module S0 (e.g., azimuth information, other elevation or topographical information) to adjust the projection image for non-perpendicular projection angles and non-flat topography, so that the image will appear as intended or as close as reasonably possible given the uneven projection zone.

Another programmed feature may be spot geometry adjustment. Where a projector beam or scanner beam contacts a projection surface it produces an illuminated spot on the projection surface. The spot geometry depends on the beam geometry and the angle of intercept between the beam and the projection surface. If the beam geometry is constant and the topography of the projection zone varies, the spot geometry will vary throughout the projected image. An IPS control module C0 may use topographical data from the scanner module S0 (and/or user-provided information or other sources of topographical data for the projection zone) to adjust the geometry of the scanner and projector beams via one or more of the beam shaping optics to P3,S3 produce the intended spot geometry throughout the image.

Another programmed feature may be beam attenuation control. The control computer C1 may control one or more aspects of beam divergence and therefore the beam attenuation via the beam shaping optics P3,S3. For example, when one or more beams are projected in a direction where there is no terminating surface, the beam divergence may be adjusted to produce a non-hazardous beam intensity.

Another programmed feature may be brightness adjustment. As described above, the topographical data from the scanner module S0 may include distance, azimuth, and reflective property data associated with various points of the projection zone. The control module may use this data to adjust the beam intensities of the projector P0 and scanner modules S0 to produce the intended brightness throughout the image.

Another programmed feature may be movement correction. Without movement correction, the projected image would be displaced by any movement of the projector. The control module may use one or more elements of the topographical data of the projection zone (such as those described above) to define stationary reference points. The user may add physical reference objects to the projection zone. These reference objects may have specific geometric or reflective properties that make them easily identifiable to the IPS. The scanner module S0 repeatedly measures the distance and azimuth to the reference points. The control module uses this data to repeatedly determine the position of the scanner S0 and projector modules P0. The control computer C1 repeatedly adjusts the projection image data going to the projector module P0 to correct for the movement of the projector module P0. The effect may be that the projected image will remain in the intended location even if the projector module P0 is moving.

One or more additional accessory modules may be added to the IPS to add functionality. By way of demonstration and not limitation, such accessory modules may include but are not limited to, a light sensing module (to determine ambient light levels and adjust the projection intensity to achieve the desired contrast ratio), a gravity sensing module (to provide a gravity reference), a gyroscopic sensor module (to provide movement and orientation data), a Global Positioning Satellite module (to provide location, orientation and movement data), a remote control module (to provide remote control of the IPS), a network module (to provide networking capabilities), or some combination thereof.

Figure 2:
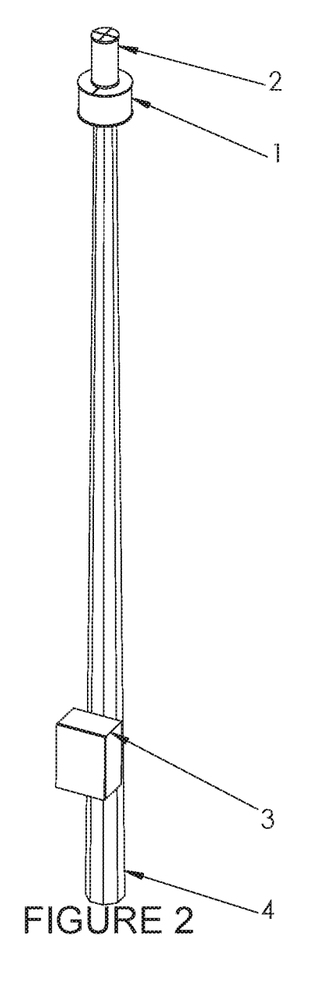
FIG. 2 illustrates an exemplary diagram of an IPS, according to various aspects described herein. In this example, the exemplary IPS includes a projector module, control module, and scanner module mounted on a mast.

FIG. 2 illustrates an exemplary IPS with the projector module 1, scanner module 2, and control module 3 mounted on a mast 4.

Figure 3:
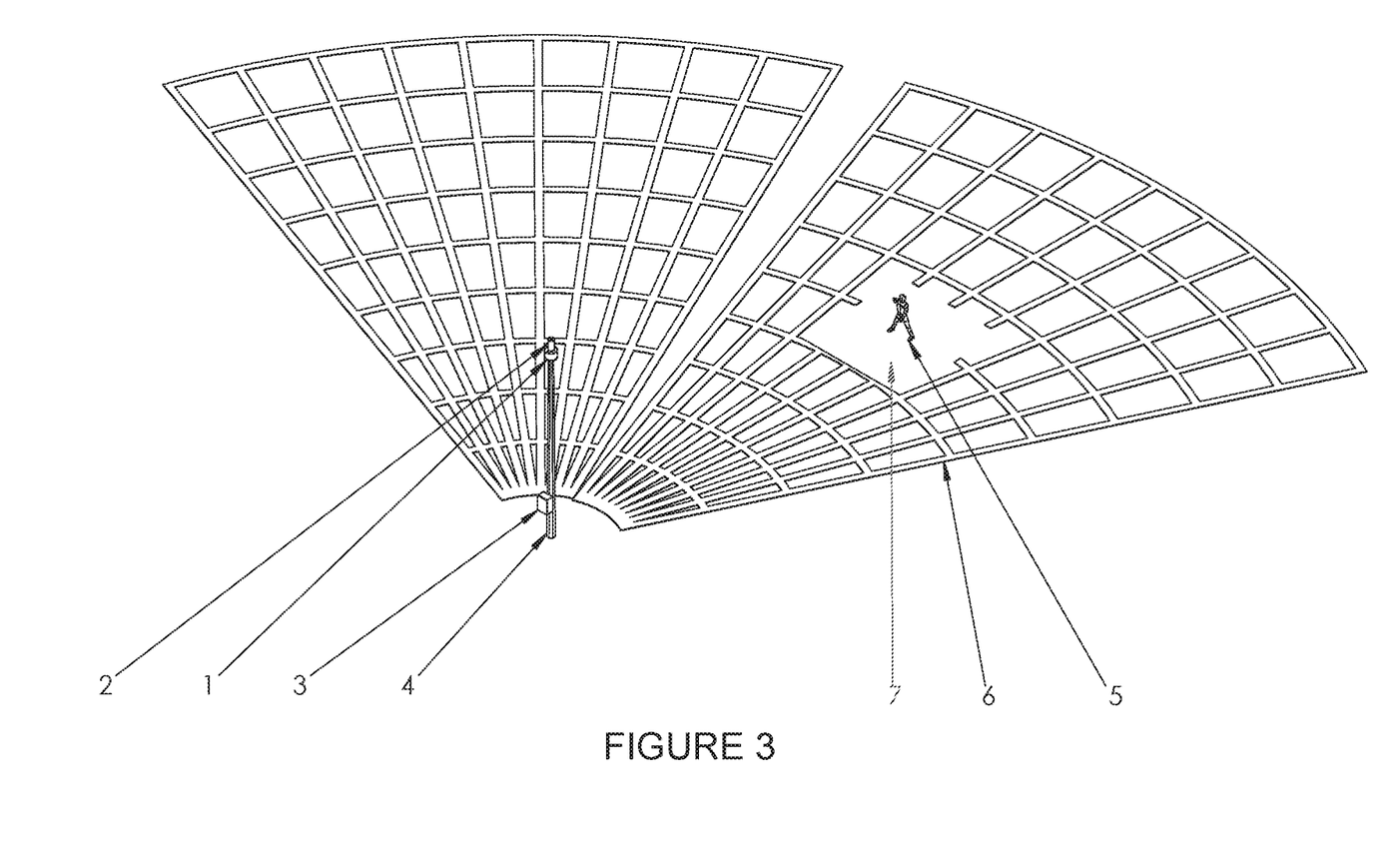
FIG. 3 illustrates an exemplary diagram of an IPS projecting an image into a projection zone, according to various aspects described herein.

FIG. 3 illustrates an exemplary IPS with the projector module 1, scanner module 2, and control module 3 mounted on a mast 4. The projector module 1 is depicted projecting grid images 6 onto a surface. A protected object zone 7 is depicted surrounding a protected object (person) 5 standing within the projection image 6.

Figure 4:
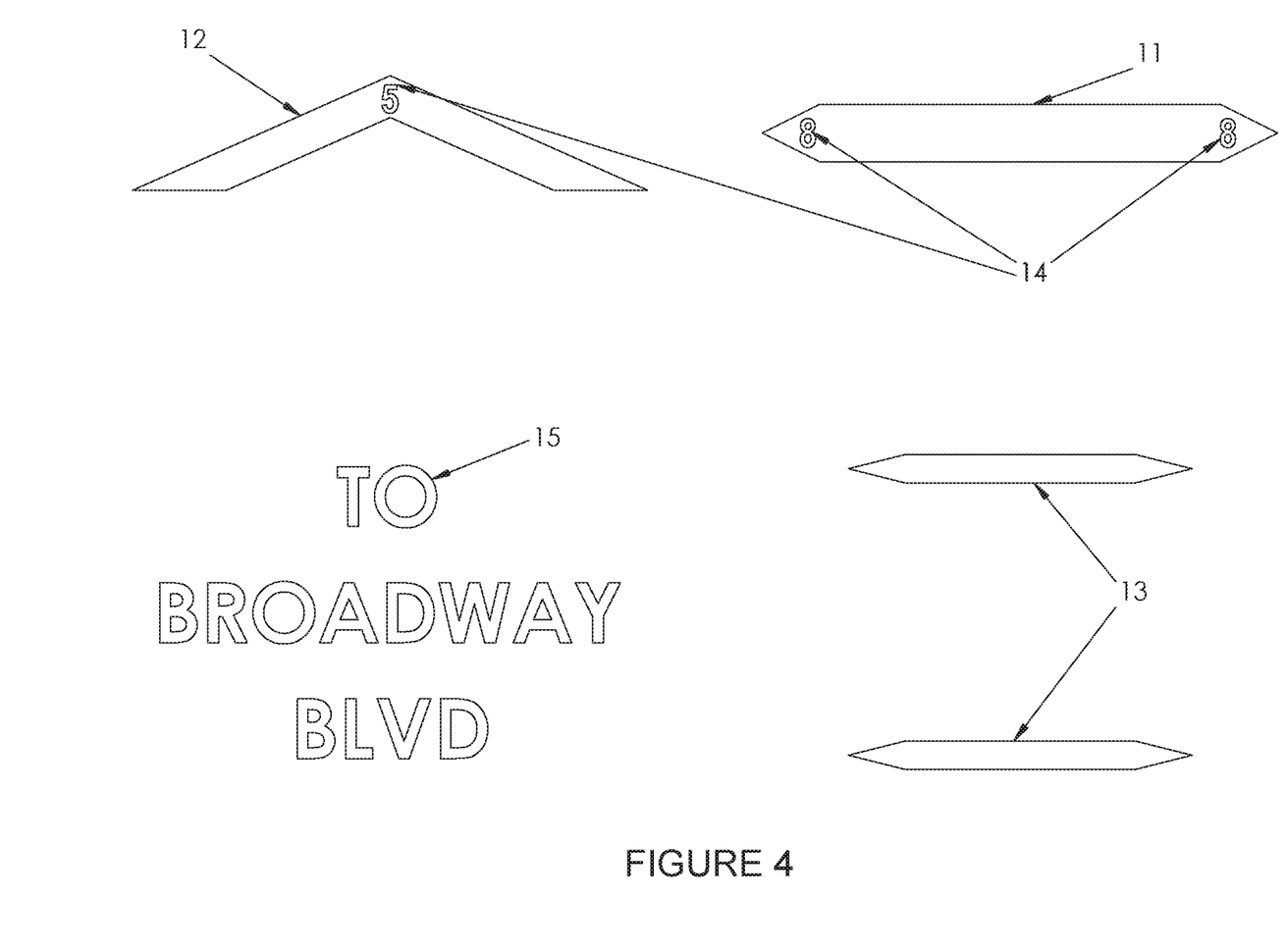
FIG. 4 illustrates an exemplary diagram of various projected signals for automobile traffic control and advisory, according to various aspects described herein.

FIG. 4 illustrates examples of various projected signals for automobile traffic control and advisory, e.g., a projected stop signal 11, a project go signal 12 (both of which include a projected countdown to signal changes 14), a projected pedestrian alert 13, and projected advisory information 15.

Figure 5:
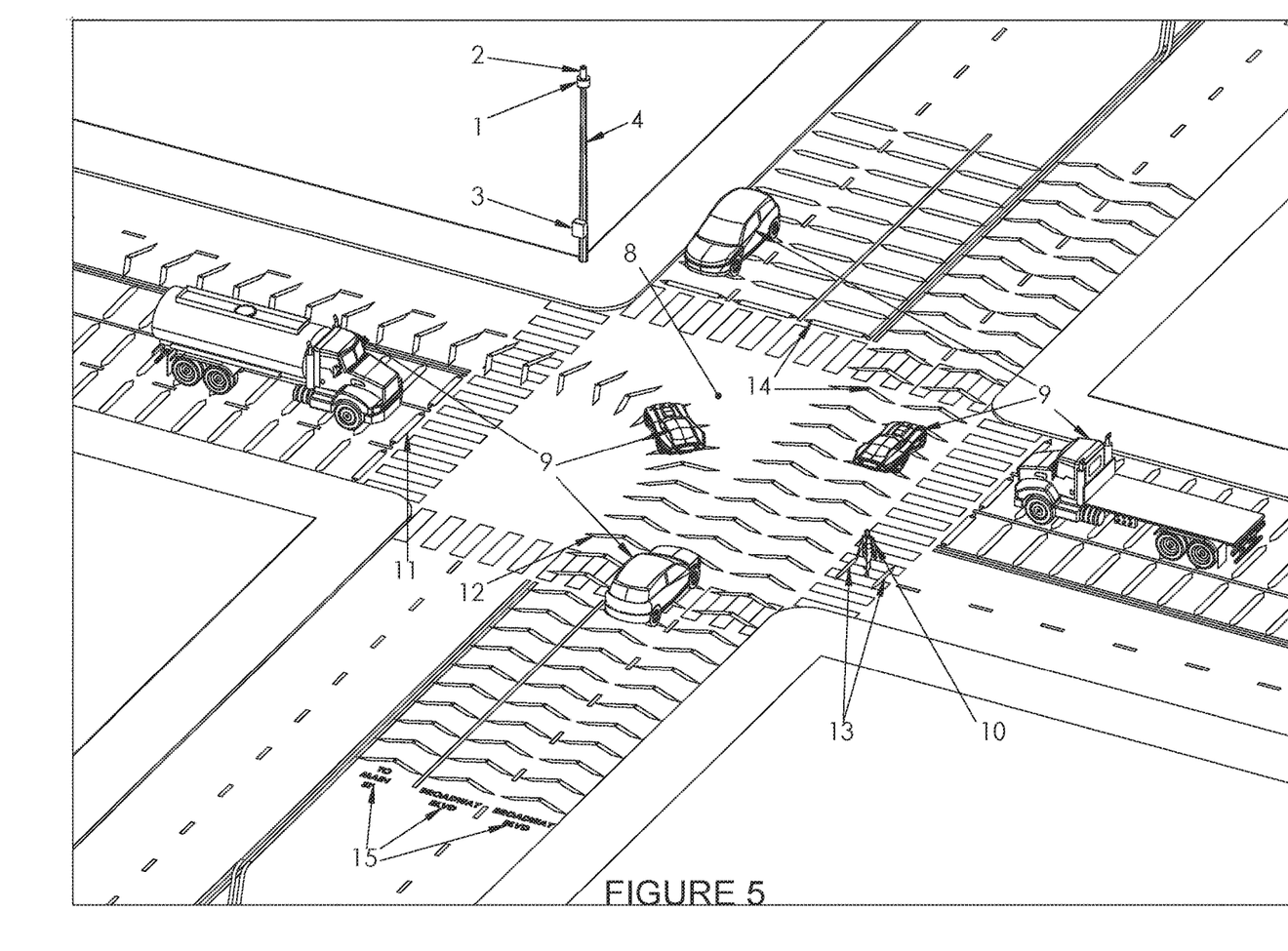
FIG. 5 illustrates an exemplary diagram of the IPS projecting various signals onto an automobile traffic intersection, according to various aspects described herein.

FIG. 5 illustrates an exemplary IPS projecting various signals onto an automobile traffic intersection. For example, FIG. 5 shows the projector module 1, scanner module 2, and control module 3 mounted on a mast 4, a street intersection 8, multiple automobiles 9, a pedestrian 10, a projected stop signal 11, a project go signal 12, a projected pedestrian alert 13, and projected advisory information 15.

Figure 6:
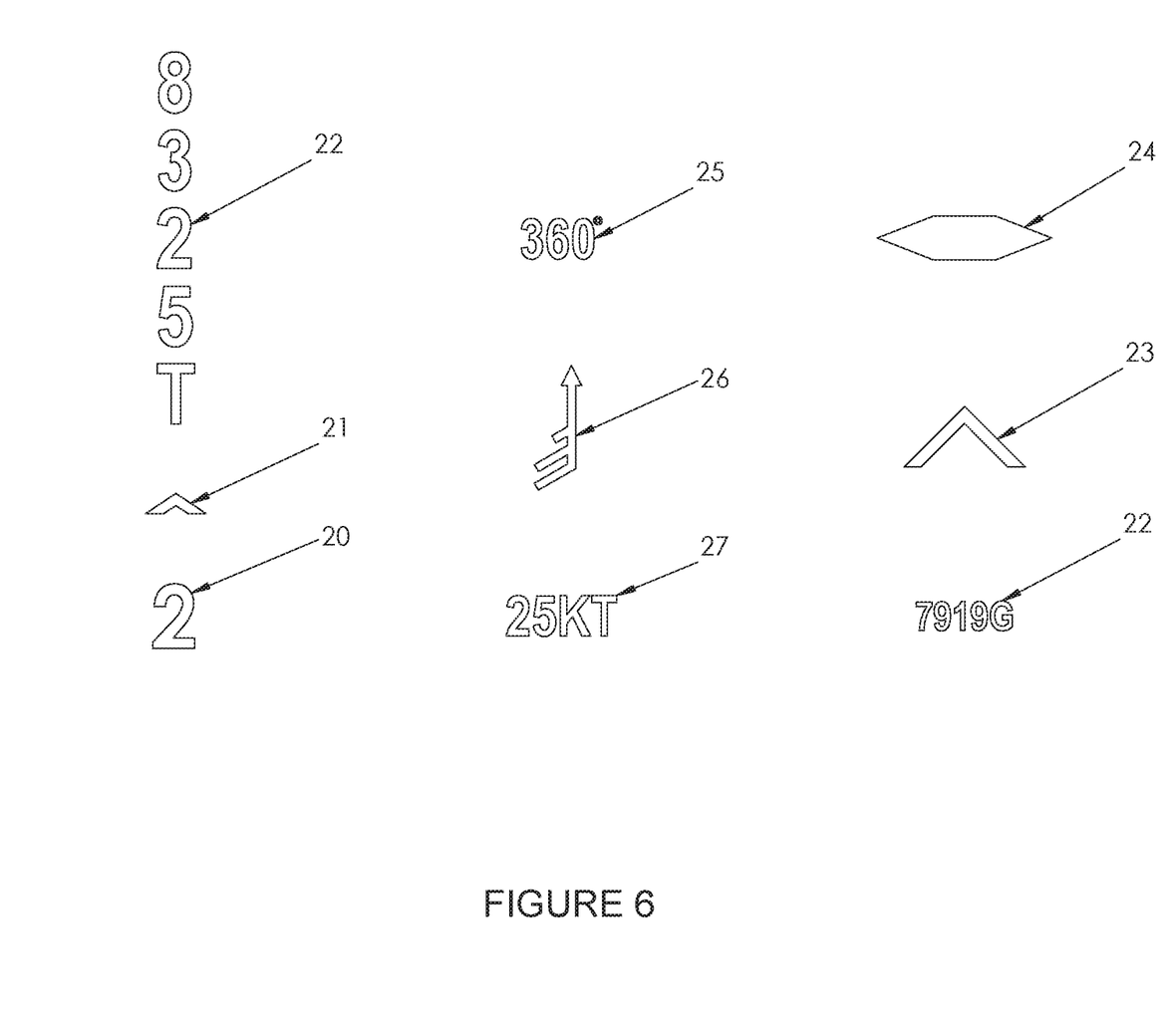
FIG. 6 illustrates an exemplary diagram of various projected signals for airport traffic control and advisory, according to various aspects described herein.
Figure 7:
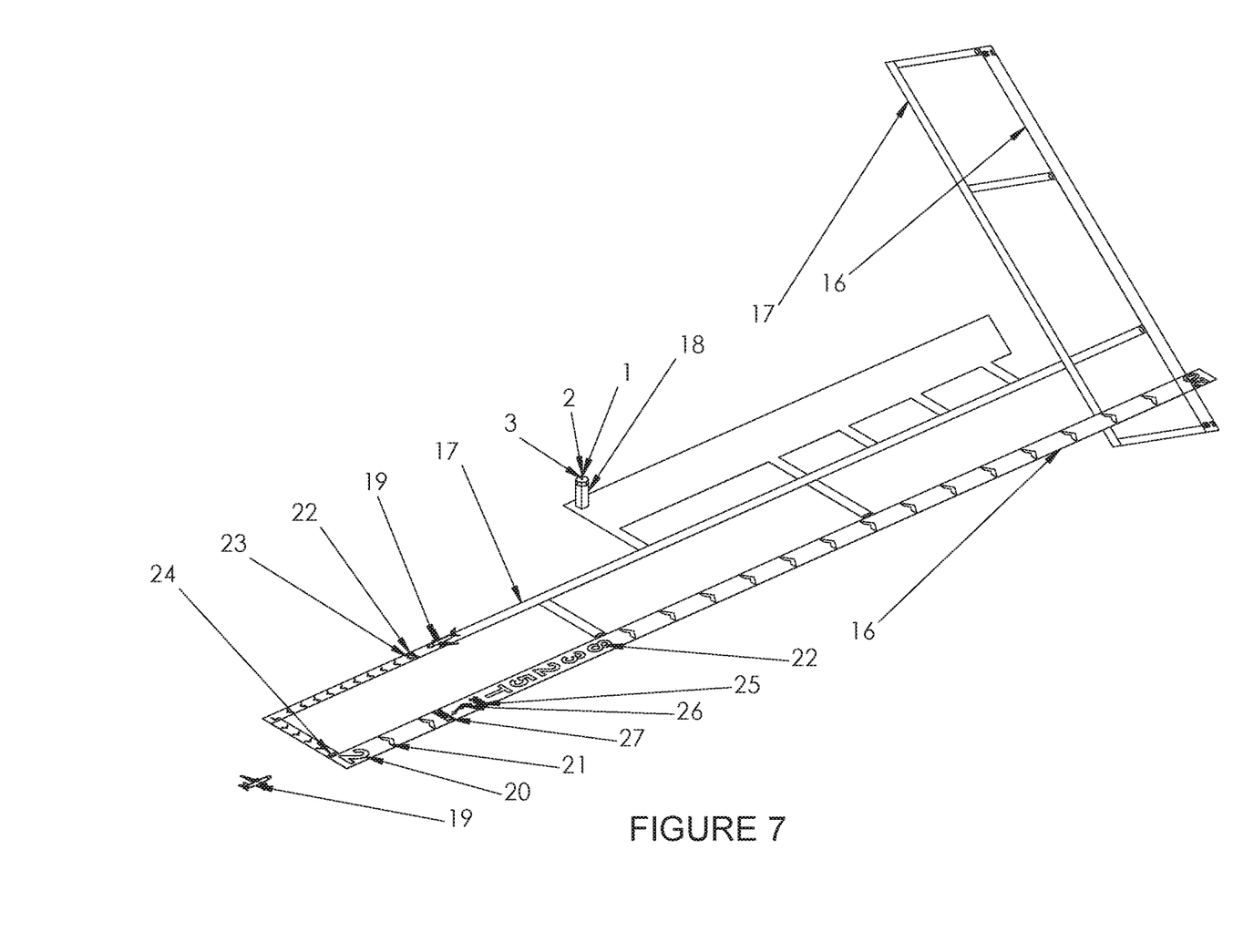
FIG. 7 illustrates an exemplary diagram of the IPS projecting signals onto airport runways and taxiways, according to various aspects described herein.
Figure 8:
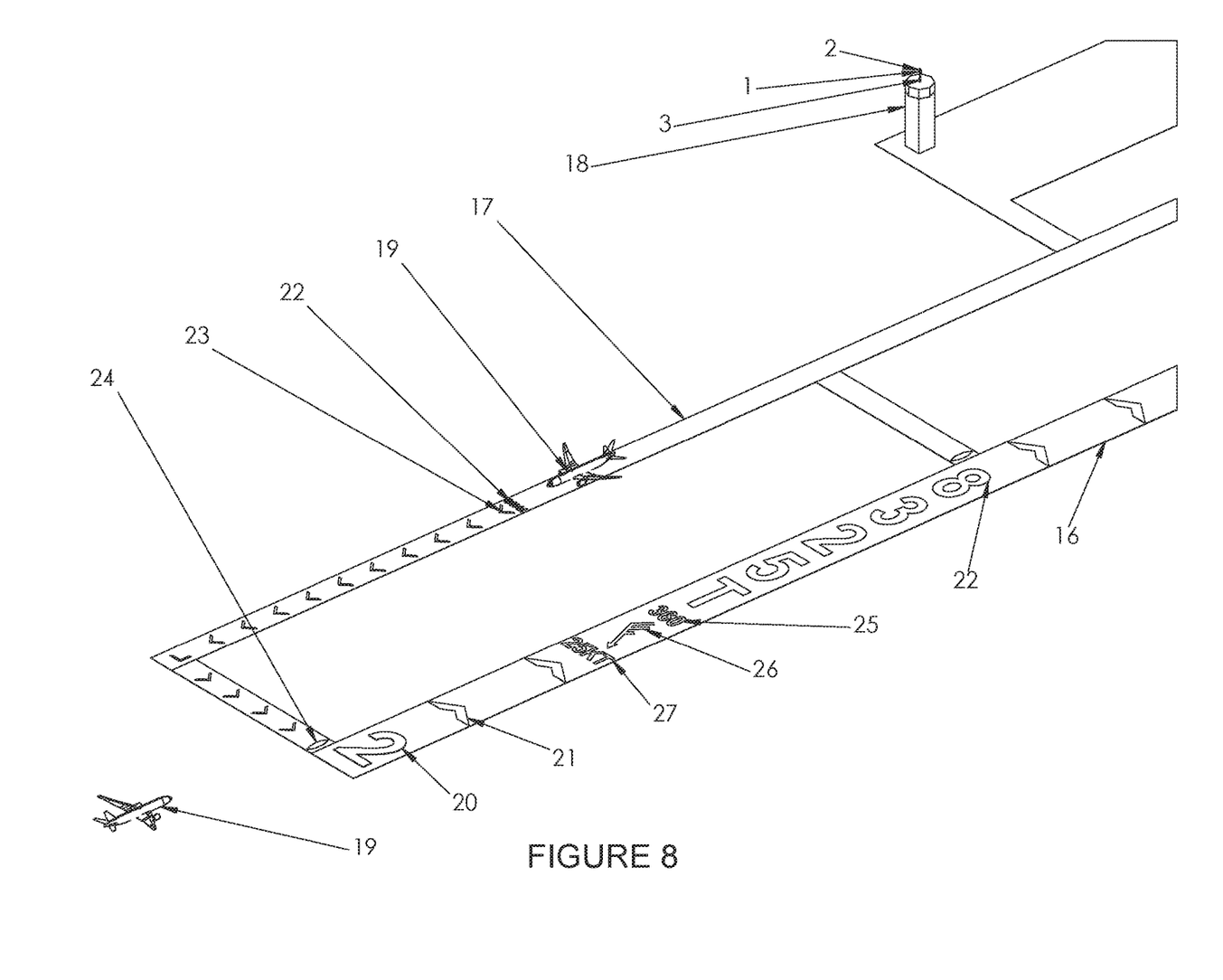
FIG. 8 illustrates another exemplary diagram of the IPS projecting signals onto airport runways and taxiways, according to various aspects described herein.

FIG. 6 illustrates exemplary projected signals for airport traffic control and advisory, e.g., a projected runway number 20, a projected clear to land/take-off signal 21, a projected tail number 22, a projected clear to taxi signal 23, a projected stop signal 24, a projected wind direction value 25, a project wind direction/speed symbol 26, and a projected wind speed value 27. FIG. 7 illustrates an exemplary diagram of the IPS projecting the aforementioned signals onto an airport runway 16 and taxiway 17. In this example, an exemplary IPS system (e.g., elements 1, 2, 3) are mounted or otherwise placed on an air traffic control ("ATC") tower. Advantageously, these lighted projections are more immediately visible to a pilot in an aircraft 19, in comparison to indictors painted on runways and taxiways. FIG. 8 illustrates another exemplary IPS projecting signals onto airport runways and taxiways. In other examples (not shown the FIGURES), the IPS or some portion thereof may be mounted or otherwise affixed to one or more vehicles, such as but not limited to, trains, automobiles, planes, unmanned aerial vehicles/systems, other appropriate vehicles, or some combination thereof.

Figure 9:
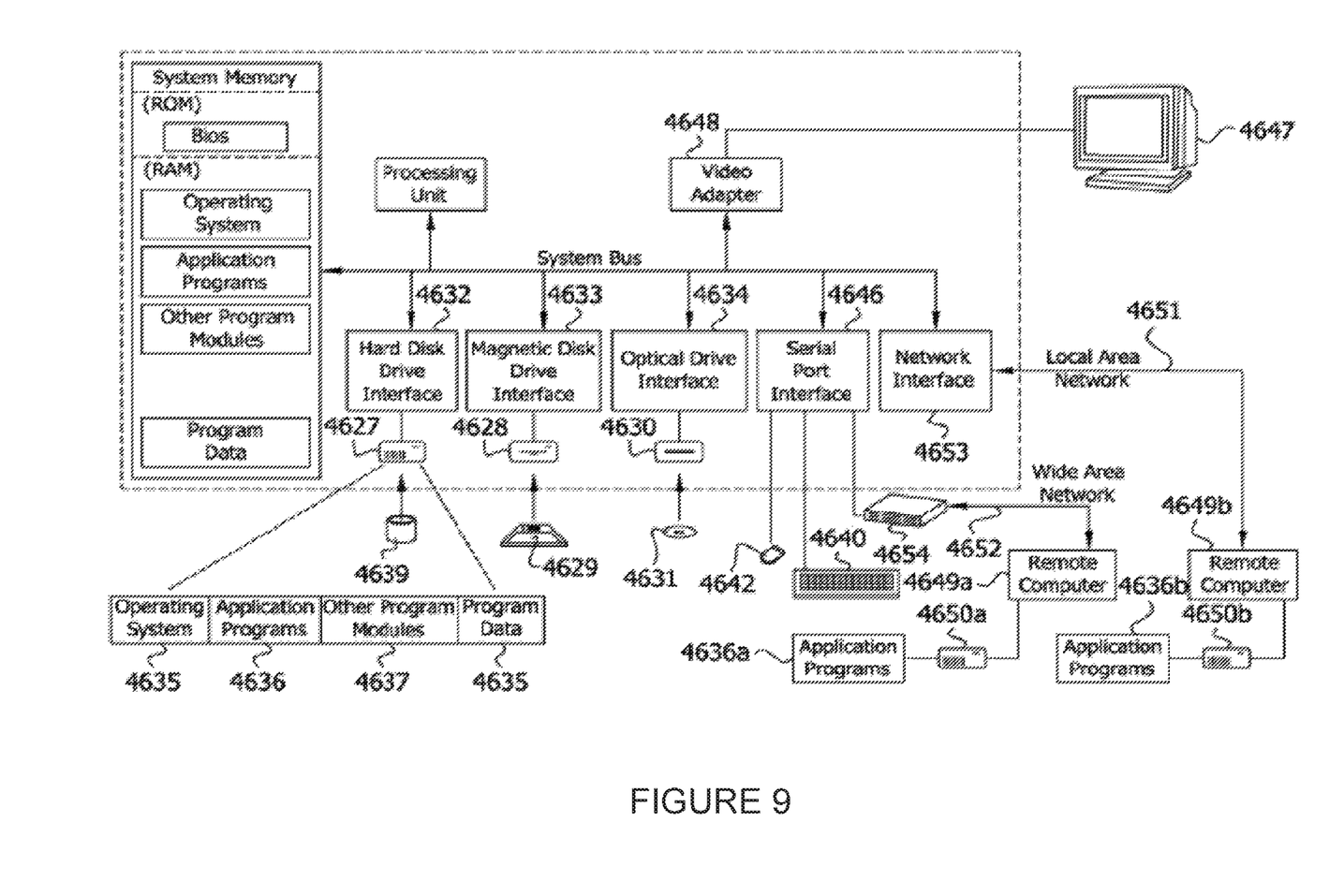
FIG. 9 is a block diagram illustrating an example of a suitable computing system environment in which aspects of the invention may be implemented.

With reference to FIG. 9 an exemplary system for implementing aspects of the invention includes a general-purpose computing device in the form of a conventional computer 4320, including a processing unit 4321, a system memory 4322, and a system bus 4323 that couples various system components including the system memory 4322 to the processing unit 4321. The system bus 4323 may be any of several types of bus structures including a memory bus or memory controller, a peripheral bus, and a local bus using any of a variety of bus architectures. The system memory includes read only memory (ROM) 4324 and random-access memory (RAM) 4325. A basic input/output system (BIOS) 4326, containing the basic routines that help transfer information between elements within the computer 20, such as during start-up, may be stored in ROM 4324.

The computer 4320 may also include a magnetic hard disk drive 4327 for reading from and writing to a magnetic hard disk 4339, a magnetic disk drive 4328 for reading from or writing to a removable magnetic disk 4329, and an optical disk drive 4330 for reading from or writing to removable optical disk 4331 such as a CD-ROM or other optical media. The magnetic hard disk drive 4327, magnetic disk drive 4328, and optical disk drive 30 are connected to the system bus 4323 by a hard disk drive interface 4332, a magnetic disk drive-interface 33, and an optical drive interface 4334, respectively. The drives and their associated computer-readable media provide nonvolatile storage of computer-executable instructions, data structures, program modules, and other data for the computer 4320. Although the exemplary environment described herein employs a magnetic hard disk 4339, a removable magnetic disk 4329, and a removable optical disk 4331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 4339, magnetic disk 4329, optical disk 4331, ROM 4324, and/or RAM 4325, including an operating system 4335, one or more application programs 4336, other program modules 4337, and program data 4338. A user may enter commands and information into the computer 4320 through keyboard 4340, pointing device 4342, or other input devices (not shown), such as a microphone, joy stick, game pad, satellite dish, scanner, or the like. These and other input devices are often connected to the processing unit 4321 through a serial port interface 4346 coupled to system bus 4323. Alternatively, the input devices may be connected by other interfaces, such as a parallel port, a game port, or a universal serial bus (USB). A monitor 4347 or another display device is also connected to system bus 4323 via an interface, such as video adapter 4348. In addition to the monitor, personal computers typically include other peripheral output devices (not shown), such as speakers and printers.

The computer 4320 may operate in a networked environment using logical connections to one or more remote computers, such as remote computers 4349 $a$ and 4349 $b$. Remote computers 4349 $a$ and 4349 $b$ may each be another personal computer, a server, a router, a network PC, a peer device or other common network node, and typically include many or all of the elements described above relative to the computer 4320, although only memory storage devices 4350 $a$ and 4350 $b$ and their associated application programs 36 $a$ and 36 $b$ have been illustrated in FIG. 1A. The logical connections depicted in FIG. 9 include a local area network (LAN) 4351 and a wide area network (WAN) 4352 that are presented here by way of example and not limitation. Such networking environments are commonplace in office-wide or enterprise-wide computer networks, intranets and the Internet.

When used in a LAN networking environment, the computer 4320 is connected to the local network 4351 through a network interface or adapter 4353. When used in a WAN networking environment, the computer 4320 may include a modem 4354, a wireless link, or other means for establishing communications over the wide area network 4352, such as the Internet. The modem 4354, which may be internal or external, is connected to the system bus 4323 via the serial port interface 4346. In a networked environment, program modules depicted relative to the computer 4320, or portions thereof, may be stored in the remote memory storage device. It will be appreciated that the network connections shown are exemplary and other means of establishing communications over wide area network 4352 may be used.

One or more aspects of the invention may be embodied in computer-executable instructions (i.e., software), such as a software object, routine or function (collectively referred to herein as a software) stored in system memory 4324 or non-volatile memory 4335 as application programs 4336, program modules 4337, and/or program data 4338. The software may alternatively be stored remotely, such as on remote computer 4349$a$ and 4349$b$ with remote application programs 4336$b$. Generally, program modules include routines, programs, objects, components, data structures, etc. that perform particular tasks or implement particular abstract data types when executed by a processor in a computer or other device. The computer executable instructions may be stored on a computer readable medium such as a hard disk 4327, optical disk 4330, solid state memory, RAM 4325, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a run-time system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any (or all) of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Embodiments within the scope of the present invention also include computer-readable media and computer-readable storage media for carrying or having computer-executable instructions or data structures stored thereon. Such computer-readable media can be any available media that can be accessed by a general purpose or special purpose computer. By way of example, and not limitation, computer-readable storage media may comprise RAM, ROM, EEPROM, CD-ROM or other optical disk storage, magnetic disk storage, or other magnetic storage devices, e.g., USB drives, SSD drives, etc., or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

While various user functionality is described above, these examples are merely illustrative of various aspects of the present invention and is not intended as an exhaustive or exclusive list of features and functionality of the invention. Other features and functionality, while not expressively described, may be provided and/or utilized to effect and/or execute the various displays, functionality, data storage, etc.

According to aspects of the present invention, embodiments of present invention may include one or more special purpose or general-purpose computers and/or computer processors including a variety of computer hardware. Embodiments may further include one or more computer-readable storage media having stored thereon firmware instructions that the computer and/or computer processor executes to operate the device as described below. In one or more embodiments, the computer and/or computer processor are located inside the apparatus, while in other embodiments, the computer and/or computer processor are located outside or external to the apparatus.

One of ordinary skill in the pertinent arts will recognize that, while various aspects of the present invention are illustrated in the FIGURES as separate elements, one or more of the elements may be combined, merged, omitted, or otherwise modified without departing from the scope of the present invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computerized projection system with sensing capability, suitable for interactively projecting geometrically accurate light images into a projection environment or zone of complex three-dimensional topography, said system comprising:
    at least one light projecting device;
    at least one sensing device that is configured to generate topographical data of a projection surface within the projection environment or zone;
    at least one computing device, said computing device being in operative communication with said at least one light projecting device for transmitting control signals to said at least one light projecting device, said computing device being in operative communication with said at least one sensing device, said computing device including:
        one or more computer processors, and
        one or more computer-readable storage media having stored thereon computer-processor executable instructions, said instructions comprising instructions for generating control signals for use in controlling said at least one light projecting device via the transmitted control signals to project one or more pre-determined images into the projection environment or zone, wherein generation of the control signals involves applying one or more correction factors that use the generated topographical data to said one or more pre-determined images to thereby adjust for non-perpendicular projection angles, and non-flat topography in the generated topographical data, such that the pre-determined images, when projected onto said projection surface, are geometrically accurate.

2. The computerized system of claim 1, wherein said at least one sensing device comprises at least one of: a light detecting and ranging (LIDAR) device, and a camera.

3. The computerized system of claim 1, wherein the computer-processor executable instructions includes analysis of the generated topographical data, and execution of object detection and/or recognition algorithms to thereby indicate at least one of a presence, movement, and importance of at least one object in the projection environment or zone, wherein said instructions further comprise instructions for:
- determining, from the generated topographical data, at least one protected object zone for the at least one object within the projection environment or zone; and
- wherein one of the correction factors is based on the at least one protected object zone, and the generation of the control signals includes disallowing light projection of hazardous intensity into the at least one protected object zone.

4. The computerized system of claim 3, wherein said instructions further include generation of the control signals for use in controlling said at least one light projecting device to project an illuminated image around said at least one protected object zone with said illuminated image having graphical effects that visually indicate at least one of a presence, movement, and importance of the respective object.

5. The computerized system of claim 4, wherein said illuminated image comprises an illuminated outline around said at least one protected object zone, representative of a shadow of said object created by said light projecting device.

6. The computerized system of claim 4, wherein the protected object zone is larger than the respective object by a pre-defined margin of safety.

7. The computerized system of claim 1, wherein the st least one light projecting device is configured to generate a beam of light, and wherein said controlling said at least one light projecting device includes controlling an intensity and/or geometry of the beam of light generated by the at least one projecting device based on the generated topographical data, including the azimuth, distance, and reflective properties of points on said projection surface.

8. The computerized system of claim 1, wherein said at least one sensing device includes at least one of: a Global Positioning System ("GPS") receiver, inertial sensor, and a gravity sensor, which are configured to generate location data that is indicative of at least one of position, orientation and movement from said sensing device, wherein the generation of the control signals involves applying at least one correction factor that uses the generated location data to said pre-determined images to thereby adjust for the position, orientation and movement whether the said light projecting device is stationary or moving.

* * * * *